US011935380B2

(12) United States Patent
Knox

(10) Patent No.: US 11,935,380 B2
(45) Date of Patent: *Mar. 19, 2024

(54) OPERATING A SCANNING SMOKE DETECTOR

(71) Applicant: Honeywell International Inc., Charlotte, NC (US)

(72) Inventor: Ronald Knox, Mount Eliza (AU)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,953

(22) Filed: Jan. 6, 2023

(65) Prior Publication Data

US 2023/0162583 A1 May 25, 2023

Related U.S. Application Data

(63) Continuation of application No. 17/513,316, filed on Oct. 28, 2021, now Pat. No. 11,551,535.

(51) Int. Cl.
*G08B 17/10* (2006.01)
*G08B 17/107* (2006.01)

(52) U.S. Cl.
CPC .................................. *G08B 17/107* (2013.01)

(58) Field of Classification Search
CPC .................................................... G08B 17/107
See application file for complete search history.

(56) References Cited

U.S. PATENT DOCUMENTS

| | | | |
|---|---|---|---|
| 4,896,031 | A | 1/1990 | Pettersson et al. |
| 5,225,810 | A | 7/1993 | Inoue et al. |
| 7,164,468 | B2 | 1/2007 | Correia et al. |
| 8,587,442 | B2 | 11/2013 | Loepfe et al. |
| 8,994,942 | B2 | 3/2015 | Vollenweider |
| 10,132,611 | B2 | 11/2018 | Steffey et al. |
| 10,379,540 | B2 | 8/2019 | Droz et al. |
| 10,545,240 | B2 | 1/2020 | Campbell et al. |
| 10,670,719 | B2 | 6/2020 | Wang et al. |
| 10,908,264 | B2 | 2/2021 | O'Keeffe |

(Continued)

FOREIGN PATENT DOCUMENTS

| | | |
|---|---|---|
| DE | 102018214209 | 2/2020 |
| EP | 2093734 | 6/2011 |

(Continued)

*Primary Examiner* — Travis R Hunnings
(74) *Attorney, Agent, or Firm* — Brooks, Cameron & Huebsch, PLLC

(57) ABSTRACT

Apparatuses, methods, and computer-readable media for operating a scanning smoke detector are described herein. One apparatus a laser emitter configured to emit a beam of light, a rotational component configured to rotate the emitter such that the beam periodically scans across an area, and a light receiver configured to receive a reflected portion of the beam of light and determine a presence of smoke particles in the area based on the reflected portion. The smoke detection apparatus can be configured to operate at a first power level, decrease the beam to a second power level responsive to a determination that an object in the area is in a path of the beam, and increase the beam to the first power level responsive to a determination that the object is no longer in the path of the beam.

20 Claims, 8 Drawing Sheets

(56) References Cited

U.S. PATENT DOCUMENTS

| | | | | |
|---|---|---|---|---|
| 11,551,535 | B1 * | 1/2023 | Knox | G08B 17/107 |
| 2010/0194574 | A1 * | 8/2010 | Monk | G01S 17/88 340/627 |
| 2013/0054187 | A1 | 2/2013 | Pochiraju et al. | |
| 2015/0362313 | A1 * | 12/2015 | Bonazzi | G01B 11/27 340/541 |
| 2018/0284282 | A1 * | 10/2018 | Hong | H01S 5/0078 |
| 2020/0056973 | A1 * | 2/2020 | Knox | G08B 29/18 |
| 2020/0158832 | A1 | 5/2020 | Kirillov | |
| 2021/0215801 | A1 | 7/2021 | Reppich et al. | |
| 2022/0268681 | A1 * | 8/2022 | Eichmann | G08B 17/107 |

FOREIGN PATENT DOCUMENTS

| | | | |
|---|---|---|---|
| KR | 10-2182719 | | 11/2020 |
| WO | 2018183515 | A1 | 10/2018 |
| WO | 2021019308 | | 2/2021 |

* cited by examiner

OPERATING A SCANNING SMOKE DETECTOR

PRIORITY INFORMATION

This application is a continuation of U.S. application Ser. No. 17/513,316, filed Oct. 28, 2021, the contents of which are incorporated by reference.

TECHNICAL FIELD

The present disclosure relates to apparatuses, methods, and computer-readable media for operating a scanning smoke detector.

BACKGROUND

Smoke detection methods, devices, and systems can be implemented in indoor environments (e.g., buildings) or outdoor environments to detect smoke. As an example, a Light Detection and Ranging (LiDAR) smoke detection system can utilize optical systems, such as laser beam emitters and light receivers, to detect smoke in an environment. Smoke detection can minimize risk by alerting users and/or other components of a fire control system of a fire event occurring in the environment.

DETAILED DESCRIPTION

Figure 1:
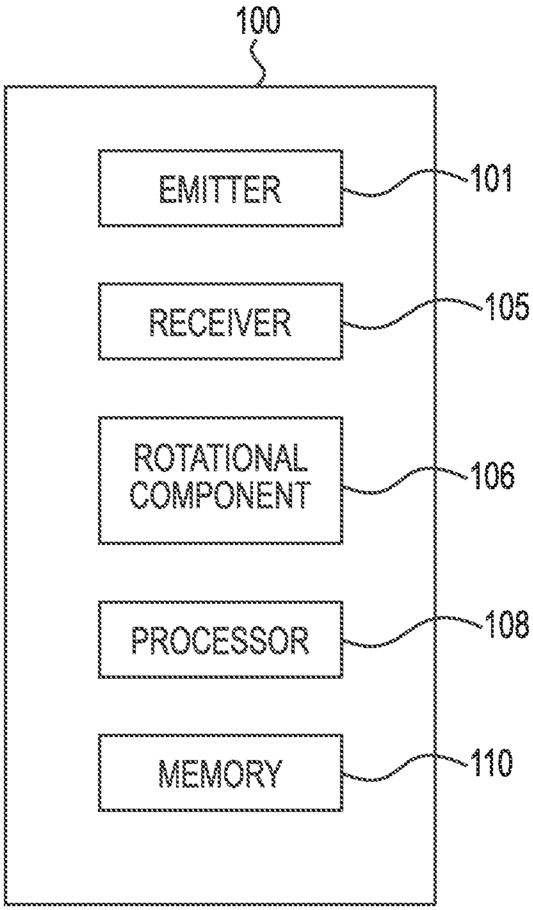
FIG. 1 is a block diagram of an example apparatus in accordance with one or more embodiments of the present disclosure.

Apparatuses, methods, and computer-readable media for operating a scanning smoke detector are described herein. One or more embodiments include a laser emitter configured to emit a beam of light, a rotational component configured to rotate the emitter such that the beam periodically scans across an area, and a light receiver configured to receive a reflected portion of the beam of light and determine a presence of smoke particles in the area based on the reflected portion, wherein the smoke detection apparatus is configured to operate at a first power level, decrease the beam to a second power level responsive to a determination that an object in the area is in a path of the beam, and increase the beam to the first power level responsive to a determination that the object is no longer in the path of the beam.

Certain smoke detection systems may use one or more laser beam emitters in conjunction with one or more light receivers to detect smoke. For example, a smoke detection system may use Light Detection and Ranging (LiDAR) technology to detect smoke. When a beam of laser light is emitted in an indoor environment, it may encounter an object, substance, or material (e.g., smoke particles) and light may be reflected and/or scattered to the light receiver. If no object, substance, or material is present in the path of the laser, the light will instead reflect and/or scatter off a wall of the indoor environment and back to the light receiver. The smoke detection system can determine the difference between a received light signal that has been reflected and/or scattered off a wall or light reflected off another object, substance, or material, because the intensity of the received light signal will be considerably greater if it has been reflected and/or scattered off a wall as opposed to reflecting and/or scattering off a substance such as smoke. Additionally, a light signal that has passed through smoke will be slightly attenuated.

As such, by rotating a laser beam emitter and light receiver of a scanning smoke detector while emitting pulses of light from the laser beam emitter, an indoor environment can be scanned to detect smoke. In one example, such a scanning smoke detector may be positioned in a corner of an area (e.g., room) and rotated from zero to 90 degrees to scan the entire area for smoke. In another example, such a scanning smoke detector may be positioned on a wall of an area and rotated from zero to 180 degrees to scan the entire area for smoke. In another example, such a scanning smoke detector may be hung from a ceiling of an area and rotated 360 degrees to scan the entire area for smoke. By recording the alignment, position, and orientation of the scanning smoke detector at the time that the smoke is detected, the approximate location of the smoke can also be determined.

Scanning smoke detectors can operate to detect smoke in relatively large areas. For instance, in some cases, scanning LiDAR smoke detectors can have an effective range of up to 100 meters, making them particularly effective for use in large open indoor spaces such as warehouses, airports, sports facilities, etc. The smoke detection sensitivity provided at longer range allows a single product installation to replace more of the spot detectors conventionally used. In a large open area, the number of spot detectors that can be replaced by a single LiDAR system increases with the square of the range. For example, a 100-meter range LiDAR scanning detector could replace four times as many spot detectors as a 50-meter range unit, at substantially the same installed cost.

The laser source used in such a detector can produce a beam made up of repeated pulses of laser light repeated at an interval. For example, a five nanosecond pulse can be repeated every 600 nanoseconds. These pulses are produced at a power level sufficient to cause the light scattered backwards from a plume of smoke to be economically detected. Because smoke may be of relatively low concentration, dark in color, and distant from the emitter/receiver, the instantaneous laser power used may be relatively high (e.g., in the order of tens of Watts).

However, high powered laser light presents the risk that the pulses could be damaging to human eyes. Even though a scanning smoke detector may be located at an elevation where the presence of people is relatively rare (e.g., near a ceiling), the risk of eye damage is nontrivial. A user performing maintenance or engaging in other tasks may place themselves in the path of a scanning smoke detector. Laser systems that are of insufficient power to cause eye damage are classified as "Class 1" according to the classification system as specified by the International Electrotechnical Commission (IEC) 60825-1 standard. Under this standard, class 1 systems are allowed to be operated in locations where people are present without special precautions, such as the permanent attendance of a trained operator. "Class 1" is therefore the preferred classification for any laser system that operates autonomously.

Previous approaches may employ mitigation techniques to avoid the potential for eye damage from high power lasers. Some previous mitigation techniques allowing laser systems to operate at a higher power include the use of optical lensing to cause the laser beam to be significantly wider than the diameter of the pupil of the human eye. Standards in force for laser eye safety are complex but may be generally considered to operate under the assumption that the human pupil may dilate to up to seven millimeters. Thus, a system may be considered generally "eye safe" (e.g., not damaging to the human eye) if the net power entering the eye via the pupil is within a defined limit. Laser systems using such techniques are classified as "Class 1M," where the "M" signifies that the system may not be "eye safe" if magnifying optics are in use. If a person is using an optical magnifier, such as binoculars, then the effective aperture for light to enter the eye is much wider and, consequently, the total power focused on the person's retina could be damaging.

Embodiments of the present disclosure can provide Class 1 smoke detection by protecting people from the potentially damaging effects of powerful laser light, even if those people are using magnifying optics. For instance, some embodiments provide a safety "interlock" system that uses the LiDAR signal itself to determine if a solid object (e.g., a person) has entered the current path of the beam. In some embodiments, an initial eye-safe low-power "exploratory" pulse can be produced to determine the presence of a solid object. Embodiments herein can thereafter avoid generating subsequent high-power and potentially eye-damaging pulses until the obstruction has been removed. The response time for power reduction can be in the order of 1 micro-second, so embodiments of the present disclosure can prevent a person using binoculars or the like to align them before the interlock system has reacted. This may permit a commercially advantageous classification for the system as Class 1 rather than Class 1M.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 201 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

As described herein, a fire control system may be any system designed to detect and/or provide a notification of fire events. For example, a fire control system may include smoke detection apparatuses and/or devices (e.g., apparatuses 100, 200, 300, 400, and/or 500) that can sense a fire occurring in the facility, alarms (e.g., speakers, strobes, etc.) that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a control unit such as a physical fire control panel (e.g., box) installed in the facility that can be used by a user to directly control the operation of the components of the fire control system. In some embodiments, the fire control system can include a non-physical control unit or a control unit located remotely from the facility.

FIG. 1 is a block diagram of an example apparatus 100 in accordance with one or more embodiments of the present disclosure. As shown in FIG. 1, the apparatus 100 includes a light emitter 101, a receiver 105, a rotational component 106, a processor 108, and a memory 110. The light emitter 101 (sometimes referred to herein as "emitter 101") can be any device, system, or apparatus configured to emit light. As used herein, the terms "light" or "beam" can include any type of radiation beam, such as a beam of laser light. These terms can also include pulses of light. The light emitted can be pulses, such as pulses of lasers. In some embodiments, the emitter 101 is a LiDAR transmitter. The emitter 101 can operate at different power levels, as described below.

The receiver 105 can include a sensor, detector, lens, or combination thereof configured to receive light and/or to convert light into a form that is readable by an instrument. In some embodiments, the receiver 105 is a LiDAR receiver or an electro-optical sensor. In some embodiments, the receiver 105 includes a clock or processing resources. The receiver 105 can be configured to measure the time taken for a pulse of light to travel from the emitter 101, reflect and/or scatter off an object, substance, or material, and travel back to the receiver 105.

As used herein, the term "reflected" may be used to refer to light that is not only reflected but may be reflected and/or scattered. For example, the light may be reflected off a surface at an angle of incidence equaling the angle of reflection. Light that is incident on a surface or material can also be scattered in a multitude of directions in accordance with embodiments of the present disclosure. The receiver 205 can be configured to receive a reflected portion of a beam of light emitted by the emitter 201 and determine a presence of smoke particles in the area based on the reflected portion.

The rotational component 106 is a component configured to rotate the light emitter 101. In some embodiments, the rotational component 106 rotates the emitter such that the beam periodically scans across an area (discussed further below). The rotational component 106 can be mechanical and/or electrical. It may be configured to rotate the emitter 101 at a particular speed and/or over a given range. For example, if the apparatus 100 is positioned in a corner of a room, the rotational component 106 may alternately rotate the emitter 101 from 0 degrees to 90 degrees and from 90 degrees to 0 degrees. If the emitter 101 emits pulses periodically as the rotational component 106 moves, the apparatus 100 can scan an entire area for smoke. In some embodiments, the rotational component 106 rotates the receiver 105 and the emitter 101 together. For instance, the rotational component can be a rotary platform or table driven by a motor.

The memory 110 can be any type of storage medium that can be accessed by the processor 108 to perform various examples of the present disclosure. For example, memory 110 can be a non-transitory computer readable medium having computer readable instructions (e.g., computer program instructions) stored thereon that are executable by the processor 108 to perform aspects of one or more embodiments of the present disclosure.

Memory 110 can be volatile or nonvolatile memory. Memory 110 can also be removable (e.g., portable) memory, or non-removable (e.g., internal) memory. For example, memory 110 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 110 is illustrated as being located in the apparatus 100, embodiments of the present disclosure are not so limited. For example, memory 110 can also be located internal to another computing resource (e.g., enabling computer readable instructions to be downloaded over the Internet or another wired or wireless connection). The apparatus 100 can include hardware, firmware, and/or logic that can perform a particular function. As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory 110 and executable by a processing resource (e.g., processor 108).

Processor 108 can execute the executable instructions stored in memory 110 in accordance with one or more embodiments of the present disclosure. For example, processor 108 can execute the executable instructions stored in memory 110 to decrease the beam to a second power level responsive to a determination that an object in the area is in a path of the beam.

Figure 2:
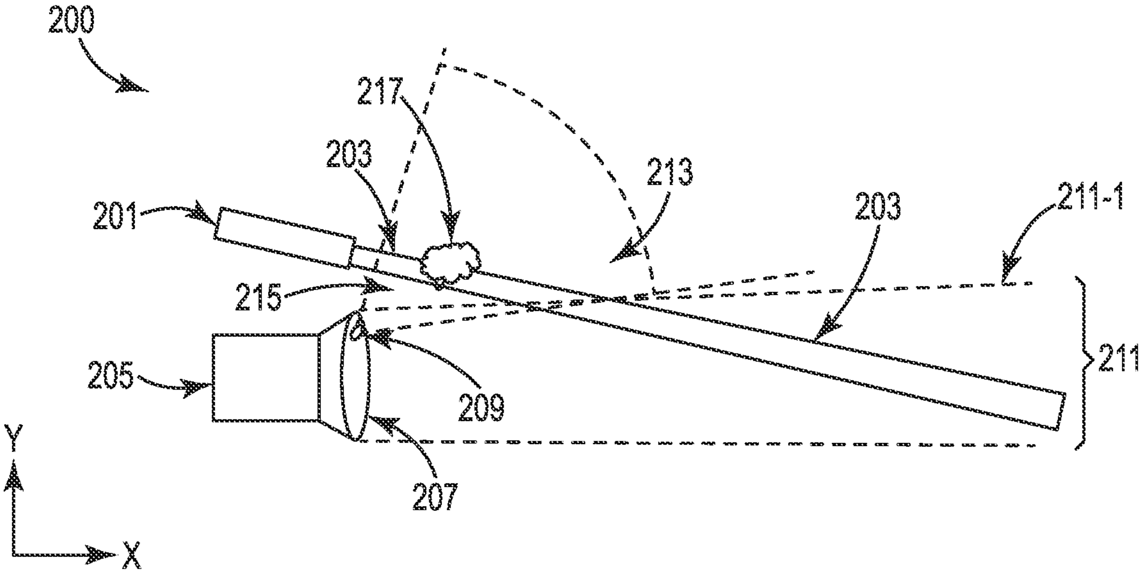
FIG. 2 illustrates an example apparatus in accordance with one or more embodiments of the present disclosure.

FIG. 2 illustrates an example apparatus 200 in accordance with one or more embodiments of the present disclosure. As shown in FIG. 2, the apparatus 200 may include a light emitter 201 configured to emit a beam 203. For example, the light emitter 201 may be a laser emitter, and the beam 203 may be a laser beam. In some embodiments, the light emitter 201 may be a photodiode or a laser diode. Although the beam 203 is illustrated in FIG. 2 as a single beam of light, in some embodiments, the light emitter 201 may emit pulses of light. For example, the light emitter 201 may emit a beam 203 at a particular time interval.

As illustrated in FIG. 2 the beam 203 may illuminate smoke particles (sometimes referred to simply as "smoke") 217. The smoke 217 (e.g., the presence of the smoke 217) may be detected by the apparatus 200 when the light forming the beam 203 is reflected from the smoke 217 to a light receiver 205 of the apparatus 200. The light receiver 205 may be configured to receive reflected light as a result of the beam 203 encountering an object, substance, or material (e.g., smoke 217). In some embodiments, the light receiver 205 may be, for example, a LiDAR receiver (e.g., a LiDAR sensor).

The apparatus 200 can be configured to detect smoke based on light received through the light receiver 205. For instance, the apparatus 200 may determine whether reflected light indicates the presence of smoke. The apparatus 200 may do so, for example, by measuring and analyzing the intensity of reflected light received by the receiver 205. If the intensity of the reflected light is below a certain level, the processor may determine that smoke 217 is present. For example, the apparatus 200 may compare the intensity level of the reflected light to that which would be expected for light reflected against a wall or another hard object; if the comparison indicates the intensity level of the reflected light is less than the expected intensity, the apparatus 200 can determine that smoke 217 is present.

The apparatus 200 may also determine the location of the smoke 217. For example, the apparatus 200 may be able to determine the location (e.g., the exact location) of the smoke 217 with respect to the light receiver 205 by measuring the amount of time between when the laser beam 203 pulse was emitted and when the reflected light was received by the light receiver 205.

The apparatus 200 may also be configured to then take an action in response to detecting smoke. For example, although not illustrated in FIG. 2 for clarity and so as not to obscure embodiments of the present disclosure, upon detecting smoke, the apparatus 200 may be configured to transmit a signal to a cloud, control panel, central monitoring system, user, or other device of a fire control system indicating the smoke has been detected. The apparatus 200 may also be configured to transmit data, such as motion of the emitter 201 and/or location of the smoke 217, to any of the foregoing examples. Data may be transmitted from the apparatus 200 with a unique identifier for the area (e.g., a room) in which the apparatus 200 is located. The apparatus 200 may have embedded software for analyzing and transmitting data and/or for detecting smoke 217.

The light receiver may include a first (e.g., primary) receiver lens 207 and a second (e.g., secondary) receiver lens 209. The primary receiver lens 207 and the secondary receiver lens 209 may be, for example, Fresnel lenses. In some embodiments, the sizes of lenses 207 and 209 may be proportional to the size of the area to be monitored for smoke (e.g., the larger the area to be monitored for smoke, the greater the sizes of lenses 207 and 209). The secondary receiver lens 209 may be designed to collect light reflected from smoke 217 that is much closer to apparatus 200 than light reflected from smoke that is further away from apparatus 200 and within the field of view of the primary receiver lens 207. Accordingly, the secondary receiver lens 209 may be significantly smaller in size than the primary receiver lens 207.

In some embodiments, the primary receiver lens 207 may be a Fresnel lens of, for example, 90-110 mm in diameter. One or both receiver lenses 207 and 209 may be molded from clear plastic. The receiver lenses 207 and 209 may be disc-shaped with multiple concentric, grooved rings. This may allow the receiver lenses 207 and 209 to collect light and direct it to a photo-sensitive element within the light receiver 205. In some embodiments, the secondary receiver lens 209 may be constructed by molding a small part of the primary receiver lens 207 at an angle to the remainder of the receiver lens 207. This would effectively make the secondary lens 209 a smaller lens within the primary receiver lens 207.

As shown in FIG. 2, the light emitter 201 and the light receiver 205 may be non-coaxial. For example, light emitter 201 may be positioned at an angle with respect to light receiver 205, and the laser beam 203 emitted by light emitter 201 and the fields of view 211 and 213 of the primary and secondary receiver lenses 207 and 209, respectively, may not be parallel, as illustrated in FIG. 2. As such, although the field of view 211 of the primary receiver lens 207 may include at least a portion of the beam 203 (e.g., field of view 211 partially overlaps the beam 203), a portion of beam 203 may be outside field of view 211 but not outside field of view 213, such that the beam 203 may also illuminate smoke 217 that is positioned outside of the field of view 211 of the primary receiver lens 207, but is not outside the field of view 213 of secondary receiver lens 209. It is noted that while non-coaxial embodiments may be discussed herein, such discussion is not intended to be taken in a limiting sense. Embodiments of the present disclosure do not limit the particular arrangement and/or configuration of the optical elements of a scanning smoke detector.

In some embodiments, the secondary receiver lens 209 may be attached to the primary receiver lens 207. For example, the secondary receiver lens 209 may be molded within the primary receiver lens 207. Further, the secondary receiver lens 209 may be positioned at an angle with respect to the primary receiver lens 207. As such, the field of view 211 of the primary receiver lens 207 may differ from the field of view 213 of the secondary receiver lens. Accordingly, the secondary receiver lens 209 may expand an overall field of view of the light receiver 205.

The field of view 213 of the secondary receiver lens 209 may at least partially overlap with the field of view 211 of the primary receiver lens 207. The field of view 213 of the secondary receiver lens 209 may include at least a portion of the beam 203. For instance, field of view 112 may include portions of the beam 203 that may not be within the field of view 211 of the primary receiver lens 207. Furthermore, the field of view 213 of the secondary receiver lens 209 may include (e.g., cover) a region 215 between an edge 211-1 of the field of view 211 of the primary receiver lens 207 and light emitter 201. The edge 211-1 may be between the laser beam 203 and the second receiver lens 209. Accordingly, the combined fields of view 211 and 213 of the primary and secondary receiver lenses, respectively, may capture the entire, or nearly the entire, beam 203.

The angle at which the primary receiver lens 207 is positioned with respect to the secondary receiver lens 209 may correspond to how much of beam 203 can be captured. This angle may be determined based on, for example, a distance between the emitter 201 and the receiver 205, an angle of the beam 203 with respect to the field of view 211 of the primary receiver lens 207, and/or an angle of the field of view 213 (e.g., angle of view) of the secondary receiver lens 209.

Figure 3:
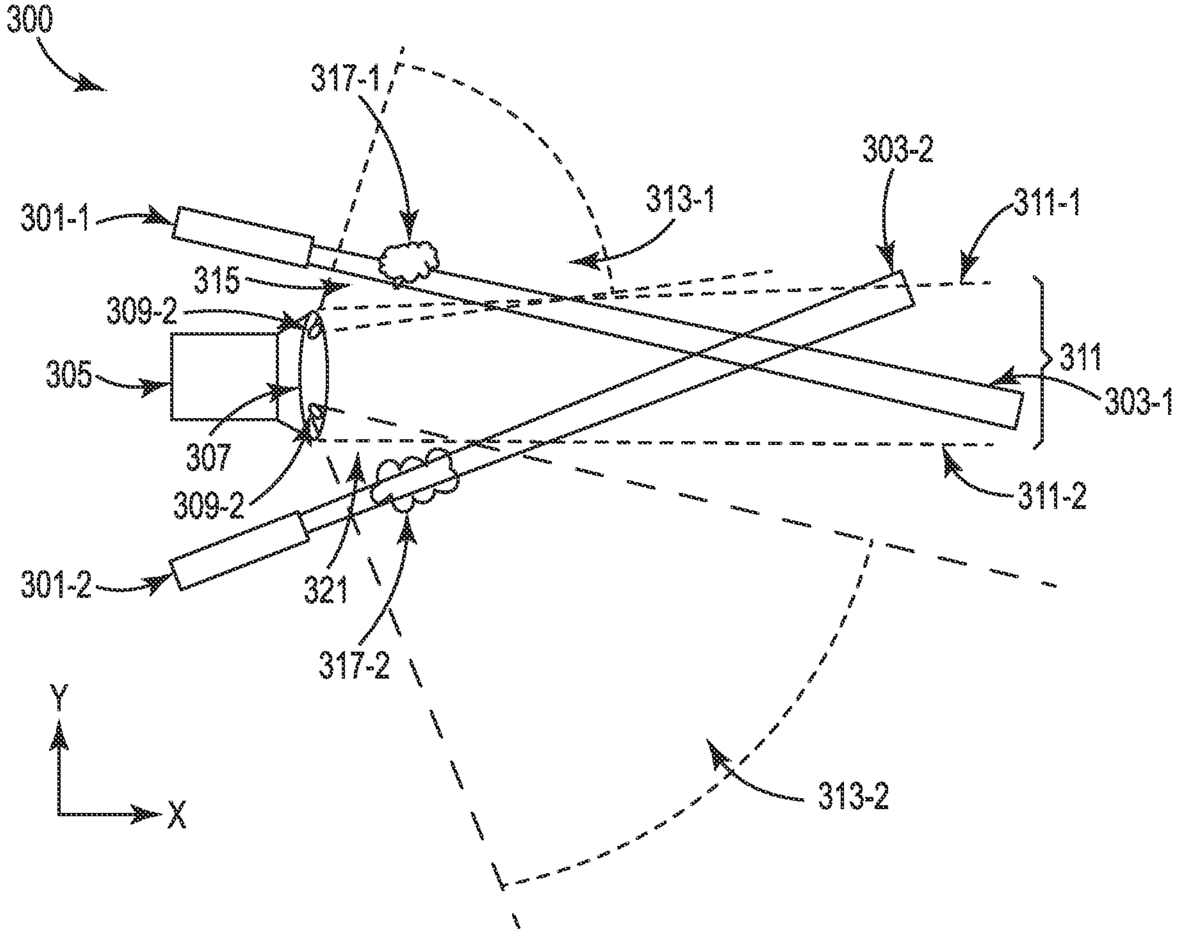
FIG. 3 illustrates another example apparatus in accordance with one or more embodiments of the present disclosure.

FIG. 3 illustrates another example apparatus 300 in accordance with one or more embodiments of the present disclosure. Some portions and/or elements of smoke detection apparatus 300 can be analogous to smoke detection apparatus 200 as shown and described in connection with FIG. 2. For example, field of view 311, and field of view edge 311-1, of primary receiver lens 307 can be analogous to field of view 211, and filed of view edge 211-1, respectively, of primary receiver lens 207 previously described in connection with FIG. 2. However, rather than a single light emitter (e.g., as shown in FIG. 2), smoke detection apparatus 300 may include multiple light emitters 301-1 and 301-2, wherein each light emitter 301-1 and 301-2 emits a different beam (laser beams 303-1 and 303-2, respectively). Each light emitter 301-1 and 301-2 may be positioned on an opposite side of light receiver 305, wherein the light receiver 305 is configured to receive light reflected by the beams 303-1 and 303-2 off of objects, substances, and materials, such as smoke 317-1 and 317-2.

Further, the light receiver 305 of the smoke detection apparatus 300, rather than including a primary receiver lens and a single secondary receiver lens (e.g., as shown in FIG. 2), can include a primary receiver lens 307 and a number of secondary receiver lenses 309-1 and 309-2. Secondary receiver lens 309-2 can ensure that smoke, such as smoke 317-2, can still be detected, even if it is outside of the fields of view 311 and 313-1 of the primary receiver lens 307 and other secondary receiver lens 303-1, and the emitter 301-2 can be non-coaxial with the light receiver 305.

In some embodiments, the emitter 301-2 can be positioned outside of the region 315 between the first edge 311-1 of the field of view 311 of the primary receiver lens and emitter 301-1. The field of view 313-2 of the emitter 301-2 can include at least a portion of the beam 303-2 emitted by the emitter 301-2. Additionally, the field of view 311 of receiver lens 307 may include at least a portion of the beam 303-2.

Secondary receiver lens 309-2 can have a field of view 313-2 which includes a region 321 between an edge 311-2 of the field of view 311 of the primary receiver lens 307 and the emitter 301-2. This can allow additional smoke, such as smoke 317-2, that is located outside the field of view 311 of the primary receiver lens 307 and the field of view 313-1 of the other secondary receiver lens 309-1 to be detected.

Figure 4:
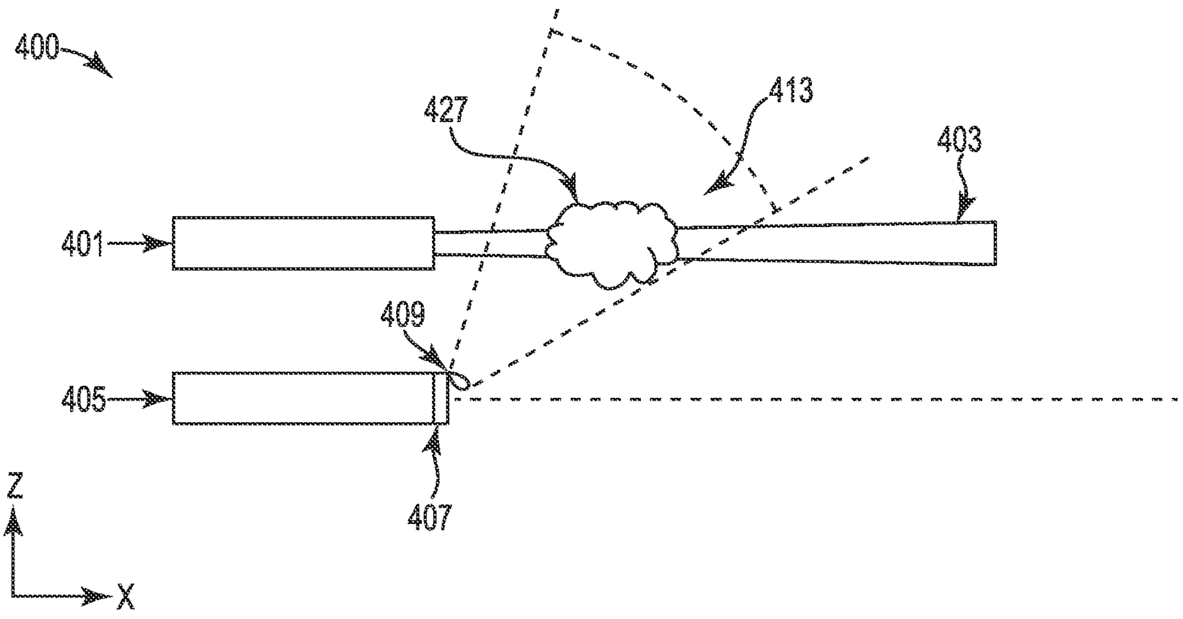
FIG. 4 illustrates another example apparatus in accordance with one or more embodiments of the present disclosure.

FIG. 4 illustrates another example apparatus 400 in accordance with one or more embodiments of the present disclosure. Apparatus 400 may include a light emitter 401 which is configured to emit a beam 403 and positioned vertically above or below a light receiver 405. The beam 403 may illuminate smoke 417. However, all of or a portion of the beam 403 may be outside of the field of view of the light receiver 405 (e.g., field of view 211 shown in FIG. 2 and field of view 311 shown in FIG. 3). As such, the light receiver may include a first receiver lens 407 and a second receiver lens 409. The second receiver lens 409 may be positioned at an angle with respect to the primary receiver lens 407 such that the field of view 413 of the second receiver lens overlaps with portions of the beam 403 that do not overlap with the field of view of the first receiver lens 407.

Figure 5A:
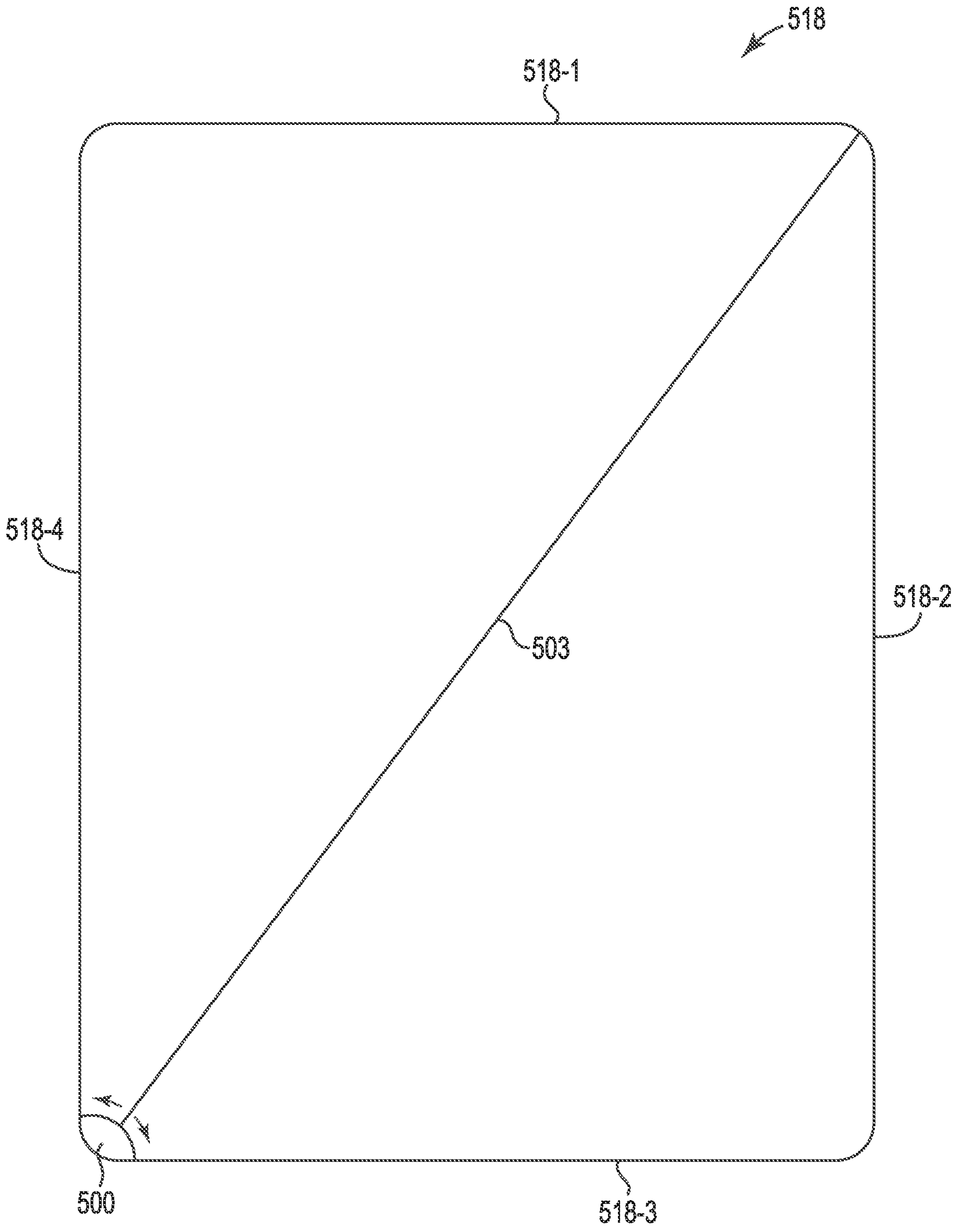
FIG. 5A is a top view of an area including an apparatus in accordance with one or more embodiments of the present disclosure.
Figure 5B:
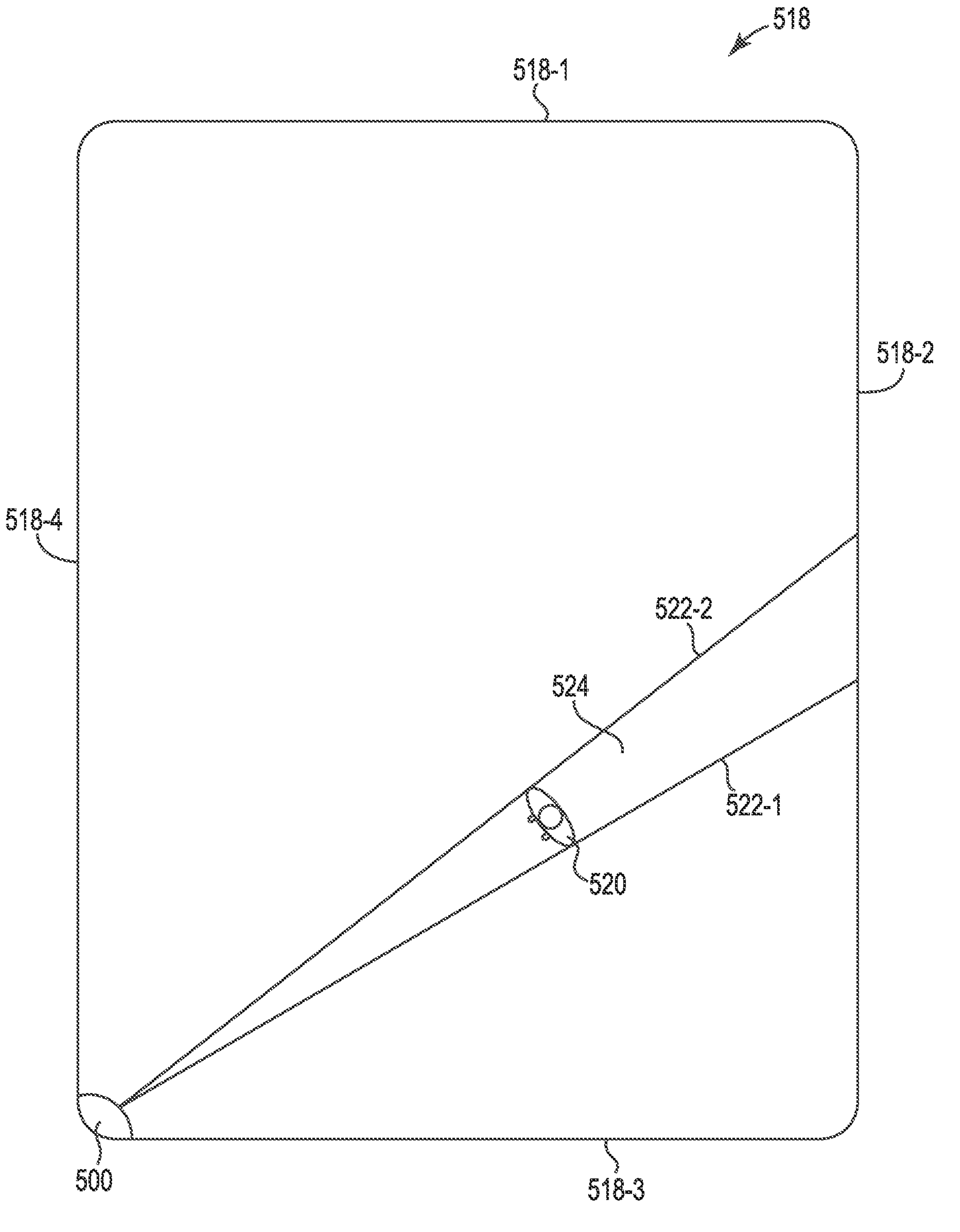
FIG. 5B is a top view of the area including the apparatus for detecting smoke and an object in accordance with one or more embodiments of the present disclosure.
Figure 5C:
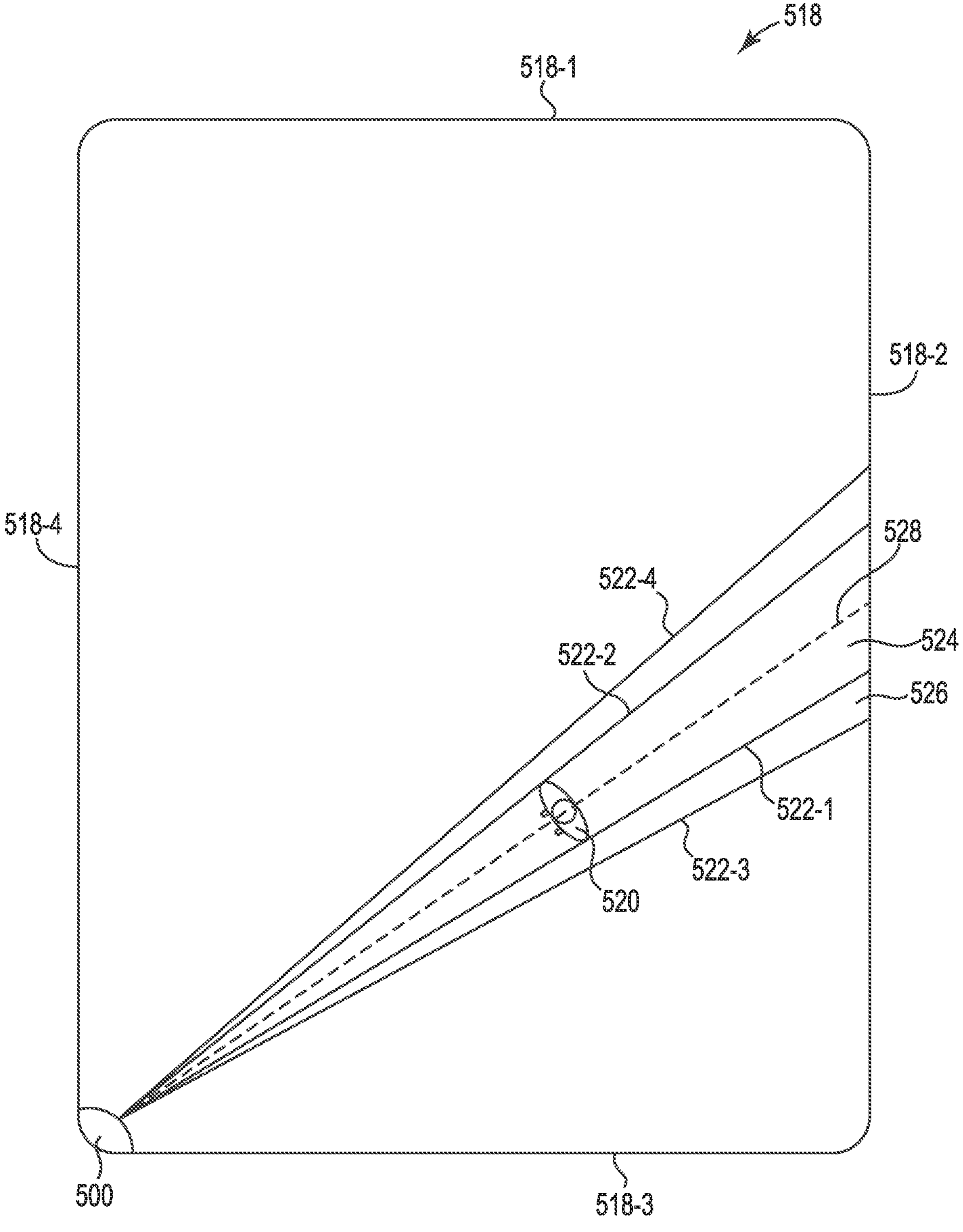
FIG. 5C is another top view of the area including the apparatus for detecting smoke and an object in accordance with one or more embodiments of the present disclosure.

FIG. 5A is a top view of an area 518 including an apparatus in accordance with one or more embodiments of the present disclosure. FIG. 5B is a top view of the area 518 including the apparatus for detecting smoke and an object in accordance with one or more embodiments of the present disclosure. FIG. 5C is another top view of the area 518 including the apparatus for detecting smoke and an object in accordance with one or more embodiments of the present disclosure. FIGS. 5A, 5B, and 5C may be cumulatively referred to as "FIG. 5."

As shown in FIG. 5, the area 518 includes a plurality of walls: a north wall 518-1, an east wall 518-2, a south wall 518-3, and a west wall 518-4. It is noted that embodiments of the present disclosure are not limited to the layout or the shape of the area 518. A smoke detecting apparatus 500, which may be analogous to a number of the apparatuses previously described in FIGS. 1-4, is shown positioned in a corner of the area where the west wall 518-4 meets the south wall 518-3.

As shown in FIG. 5, the apparatus 500 emits a beam 503 across the area 518. In some embodiments, the beam is more than 7 millimeters in diameter. For instance, in some embodiments the beam exceeds 25 millimeters. The apparatus can emit the beam 503 at a first power level while the emitter rotates such that the beam 503 periodically scans across the area 518. Scanning the area 518 with the beam 503 can include passing the beam 503 from the south wall 518-3, along the east wall 518-2, to the west wall 518-4. A "scan" of the beam 503 can refer to a rotation of the emitter such that the beam begins at an initial angular position and ends at a terminal angular position. For example, a scan of the area 518 can include the beam moving from an angle substantially parallel to the south wall 518-3 (e.g., 0 degrees) to an angle substantially parallel to the west wall 518-4 (e.g., 90 degrees). A scan (e.g., a subsequent scan) can include the beam moving from an angle substantially parallel to the west wall 518-4 (e.g., 90 degrees) to an angle substantially parallel to the south wall 518-3 (e.g., 0 degrees).

The apparatus 500 can undergo a commissioning phase wherein the area 518 is scanned and the shape and nature of the area 518 is determined by the apparatus 500. Any fixed objects in the area 518 may be mapped during this phase.

It should be appreciated that the location of the apparatus 500 in the area 518 dictates the nature of the scanning performed by the apparatus 500. For example, an apparatus mounted on a straight wall, rather than in a corner, may scan a region of 180 degrees rather than 90 degrees. An apparatus hung from a ceiling may continually rotate, scanning 360 degrees.

The first power level, as described herein, is a "high" power level. In some embodiments, the first power level is between 30 and 50 Watts. In some embodiments, the first power level is between 35 and 45 Watts. In some embodiments, the first power level is between 39 Watts and 41 Watts. In some embodiments, the first power level is approximately 40 Watts. The first power level is a level at which the apparatus 500 can detect smoke in the area 518 in a manner as discussed above, for instance. The apparatus 500 can continue to periodically scan the area 518 for smoke at the first power level until an object enters a path of the beam 503 (e.g., as shown in FIG. 5B).

As shown in FIG. 5B, an object 520 (e.g., a person) in the area has entered the path of the beam 503. The presence of the object 520 can be determined using a receiver, as described herein. For instance, the receiver can be configured to measure the time taken for a pulse of light to travel from the emitter, reflect off the object 520 and travel back to the receiver. Embodiments herein can determine that the object 520 is in the path of the beam 503 and, responsive thereto, decrease the beam to a second power level. In some embodiments, the decrease in power is carried out in less than one microsecond. The second power level is a power level that is insufficient to cause damage to a human eye. In some embodiments, the second power level is between 5 and 15 watts. In some embodiments, the second power level is between 9 Watts and 11 Watts. In some embodiments, the second power level is approximately 10 Watts.

In the example illustrated in FIG. 5B, the apparatus 500, while scanning northward, determines that the object 520 is in the path of the beam 503 while the emitter is at a first angular position 522-1 and reduces to the second power level. The apparatus 500 can continue to scan northward at the second power level until the object 520 is no longer in the path of the beam 503, which it determines while the emitter is at a second angular position 522-2. Responsive to the determination that the object 520 is no longer in the path of the beam 503, the power level is increased back to the first power level and scanning continues at the first power level. The apparatus 500 can determine the first angular position 522-1 and the second angular position 522-2 using an angle measuring sensor, for instance, and store the first angular position 522-1 and the second angular position 522-2 in memory.

As shown in FIG. 5B, an angle between the first angular position 522-1 and the second angular position 522-2 defines a sector 524. During another scan subsequent to the determination of the object 520 (in this example a southward scan), the apparatus 500 can operate at the first power level outside of the sector 524 and operate at the second power level inside of the sector 524. Stated differently, embodiments herein can reduce power on subsequent scans preemptively (e.g., without redetermining the presence of the object 520). In some embodiments, such as the example discussed in connection with FIG. 5C, the size of the sector 524 can be increased to provide an additional measure of safety and/or allow for movement of the object 520.

In some embodiments, this preemptive reduction in power can continue for a particular period of time. In some embodiments, this preemptive reduction in power can continue for a particular quantity of scans. In some embodiments, this preemptive reduction in power can continue until a determination is made that the object 520 is no longer in the path of the beam 503 when the emitter is between the first angular position 522-1 and the second angular position 522-2. For example, in some embodiments, the second power level is sufficient to determine whether the object 520 is still in the path of the beam 503. If the object 520 remains in the path of the beam 503 for a period of time exceeding a time threshold, some embodiments include providing a notification (e.g., an alarm).

In some embodiments, such as the example discussed in connection with FIG. 5C, the size of the sector can be increased to provide an additional measure of safety and/or allow for movement of the object 520. Stated differently, the portion of the scan during which power is reduced to the second power level can be increased in size beyond the determined edges of the object. As shown in FIG. 5C, a third angular position 522-3 and a fourth angular position 522-4 define a second sector 526. As shown, the second sector 526 can share a common centerline 528 with the sector 524. The second sector 526 can be larger than the sector 524 by a particular amount and/or proportion. In some embodiments, for instance, the second sector 526 can be between 1% and 100% larger than the sector 524. In some embodiments, the second sector 526 can be between 2 degrees and 10 degrees wider than the sector 524.

Figure 6:
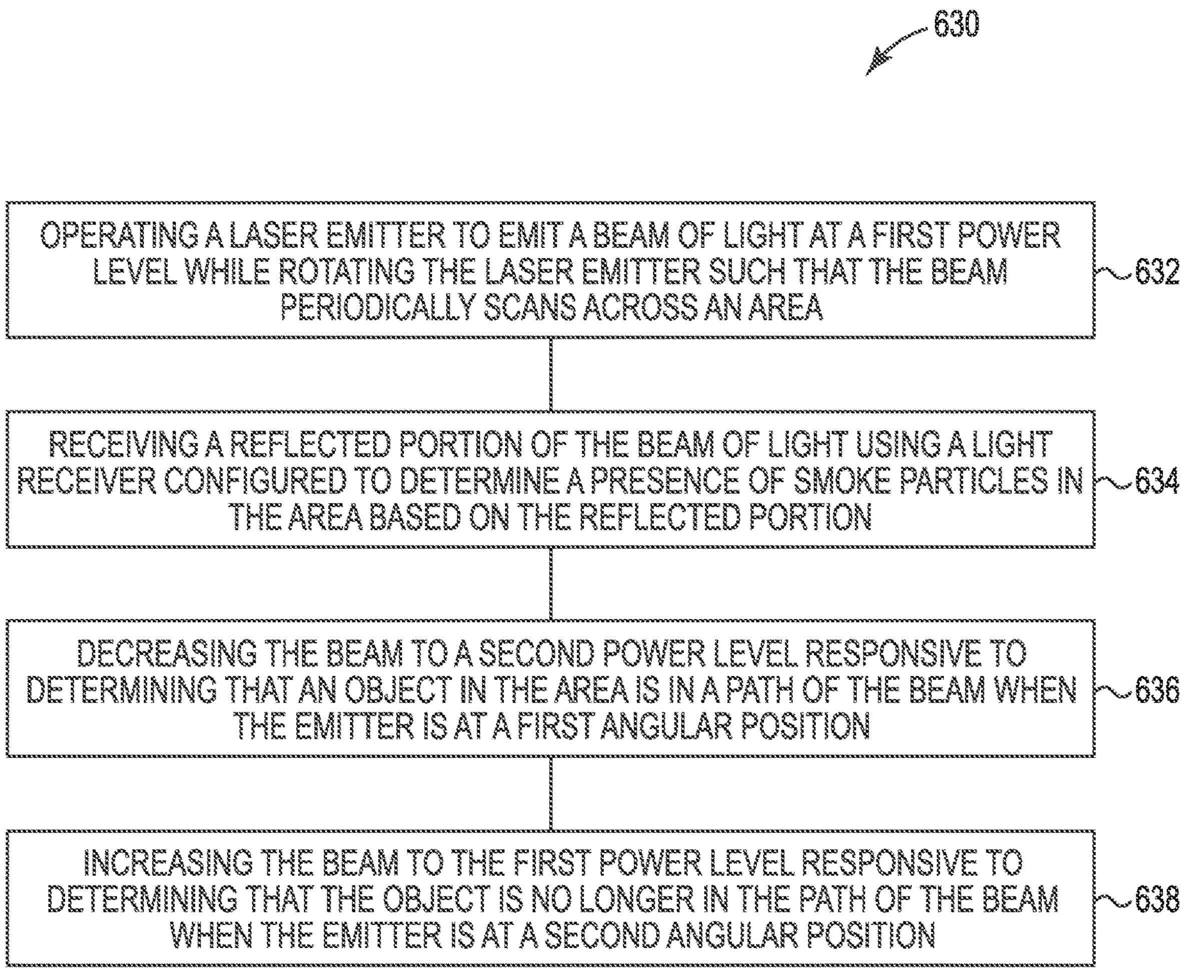
FIG. 6 illustrates a method for operating a scanning smoke detector in accordance with one or more embodiments of the present disclosure.

FIG. 6 illustrates a method 630 for operating a scanning smoke detector in accordance with one or more embodiments of the present disclosure. The method 630 can include, at 632, operating a laser emitter to emit a beam of light at a first power level while rotating the laser emitter such that the beam periodically scans across an area. The method 630 can include, at 634, receiving a reflected portion of the beam of light using a light receiver configured to determine a presence of smoke particles in the area based on the reflected portion.

The method 630 can include, at 636, decreasing the beam to a second power level responsive to determining that an object in the area is in a path of the beam when the emitter is at a first angular position. The method 630 can include, at 638, increasing the beam to the first power level responsive to determining that the object is no longer in the path of the beam when the emitter is at a second angular position.

In some embodiments, the method 630 includes operating the laser emitter to emit the beam of light at the second power level between the first angular position and the second angular position for a particular period of time after determining that the object is no longer in the path of the beam when the emitter is at the second angular position. In some embodiments, the method 630 includes operating the laser emitter to emit the beam of light at the first power level responsive to determining that the object is no longer in the path of the beam when the emitter is between the first angular position and the second angular position. In some embodiments, the method 630 includes decreasing the beam to the second power level responsive to determining that the object or a different object in the area is in the path of the beam when the emitter is at a third angular position and increasing the beam to the first power level responsive to determining that the object or the different object is no longer in the path of the beam when the emitter is at a fourth angular position.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for operating a scanning smoke detector, comprising:

operating a laser emitter to emit a beam of light at a first power level while moving the laser emitter such that the beam periodically scans across an area;

decreasing the beam to a second power level responsive to determining that an object in the area is in a path of the beam when the emitter is at a first angular position; and increasing the beam to the first power level responsive to determining that the object is no longer in the path of the beam when the emitter is at a second angular position.

2. The method of claim 1, wherein the method includes operating the laser emitter to emit the beam of light at the second power level between the first angular position and the second angular position for a particular period of time after determining that the object is no longer in the path of the beam when the emitter is at the second angular position.

3. The method of claim 1, wherein the method includes operating the laser emitter to emit the beam of light at the first power level responsive to determining that the object is no longer in the path of the beam when the emitter is between the first angular position and the second angular position.

4. The method of claim 1, wherein the method includes decreasing the beam to the second power level responsive to determining that the object in the area is in the path of the beam when the emitter is at a third angular position.

5. The method of claim 1, wherein the method includes decreasing the beam to the second power level responsive to determining a different object in the area is in the path of the beam when the emitter is at a third angular position.

6. A smoke detection apparatus, comprising:

a laser emitter configured to emit a beam of light that periodically scans across an area;

wherein the smoke detection apparatus is configured to:

operate the beam at a first power level;

decrease the beam to a second power level responsive to a determination that an object in the area is in a path of the beam; and increase the beam to the first power level responsive to a determination that the object is no longer in the path of the beam.

7. The apparatus of claim 6, further comprising a rotational component configured to rotate the laser emitter while the laser emitter emits the beam of light.

8. The apparatus of claim 6, wherein the first power level exceeds 30 Watts.

9. The apparatus of claim 6, wherein the second power level is less than 15 watts.

10. The apparatus of claim 6, further comprising a light receiver configured to determine a presence of smoke particles in the area.

11. The apparatus of claim 6, wherein the second power level is insufficient to cause damage to a human eye.

12. The apparatus of claim 6, wherein the laser emitter is configured to emit the beam of light in a plurality of pulses.

13. The apparatus of claim 6, wherein the apparatus is configured to decrease the beam to the second power level responsive to a determination that the object is in the path of the beam when the emitter is at a first angular position.

14. The apparatus of claim 13, wherein the apparatus is configured to increase the beam to the first power level responsive to a determination that the object is no longer in the path of the beam when the emitter is at a second angular position.

15. The apparatus of claim 6, wherein the apparatus is configured to decrease the beam to the second power level within 1 microsecond of the determination that the object in the area is in the path of the beam.

16. A non-transitory computer-readable medium having instructions stored thereon which, when executed by a processor, cause the processor to:

operate a laser emitter to emit a beam of light at a first power level while the beam periodically scans across an area;

decrease the beam to a second power level responsive to a determination that an object in the area is in a path of the beam; and increase the beam to the first power level responsive to a determination that the object is no longer in the path of the beam.

17. The medium of claim 16, including instructions to determine an angular position of the laser emitter responsive to the determination that the object in the area is in the path of the beam.

18. The medium of claim 16, including instructions to determine an angular position of the laser emitter responsive to the determination that the object is no longer in the path of the beam.

19. The medium of claim 16, including instructions to operate the laser emitter to emit the beam of light at the second power level for a particular quantity of periodic scans across the area by the beam after determining that the object is no longer in the path of the beam.

20. The medium of claim 16, including instructions to determine a presence of smoke particles in the area based on a reflected portion of the beam of light.

* * * * *